United States Patent [19]
Watanabe

[11] Patent Number: 5,676,777
[45] Date of Patent: Oct. 14, 1997

[54] HIGH-SPEED HEAVY DUTY PNEUMATIC RADIAL TIRES WITH SPECIFIED BEAD SECTION

[75] Inventor: Jun Watanabe, Tokyo, Japan

[73] Assignee: Bridgestone Corporation, Tokyo, Japan

[21] Appl. No.: 569,839

[22] Filed: Dec. 8, 1995

[30] Foreign Application Priority Data

Dec. 9, 1994 [JP] Japan ................................. 6-306528

[51] Int. Cl.⁶ ........................... B60C 15/024; B60C 15/04
[52] U.S. Cl. ................................... 152/540; 152/544
[58] Field of Search ........................ 152/544, 539, 152/540

[56] References Cited

U.S. PATENT DOCUMENTS

| | | | |
|---|---|---|---|
| 4,207,940 | 6/1980 | Roger | 152/544 X |
| 4,434,831 | 3/1984 | Uemura | 152/544 X |

FOREIGN PATENT DOCUMENTS

| | | | |
|---|---|---|---|
| 0531007 | 3/1993 | European Pat. Off. | 152/539 |
| 2275323 | 1/1976 | France . | |
| 2672546 | 8/1992 | France . | |
| 2200504 | 8/1990 | Japan . | |
| 6206408 | 7/1994 | Japan | 152/539 |
| 7195916 | 8/1995 | Japan . | |

*Primary Examiner*—Adrienne C. Johnstone
*Attorney, Agent, or Firm*—Sughrue, Mion, Zinn, Macpeak & Seas, PLLC

[57] ABSTRACT

A high-speed heavy duty pneumatic radial tire for use in airplanes or the like comprises a radial carcass extending between a pair of bead cores, in which a distance between outer surfaces of bead portions is equal to a rim width of a nominal rim and a bead base of each bead portion has a profile between bead heel and bead toe satisfying specified requirements.

5 Claims, 2 Drawing Sheets

FIG_1

HIGH-SPEED HEAVY DUTY PNEUMATIC RADIAL TIRES WITH SPECIFIED BEAD SECTION

BACKGROUND OF THE INVENTION

1. Field of the Invention

This invention relates to pneumatic tires and more particularly to a high-speed heavy duty pneumatic radial tire for use in airplanes and the like.

2. Description of the Related Art

In airplane tires, it is required to reduce the tire weight as far as possible. For this purpose, as disclosed in JP-A-2-200504, it is known that a carcass ply is made into a radial structure and a bead core mooring such a carcass ply in a bead portion is made into a circular shape in cross-section having a higher strength utilization as compared with a strand bead.

In general, when a large braking force is applied to the tire, there is caused slipping of the tire on the rim (deviation between tire and rim), whereby the braking distance may be prolonged or the tire and/or the rim may be damaged. Particularly, a large braking force is applied to an airplane tire during landing so that rim slippage is apt to be caused. The occurrence of rim slippage becomes conspicuous in a pneumatic radial tire for airplanes having a bead core of a circular shape in section.

It has been known that rim slippage of the tire is prevented by simply making a tightening interference of the rim large over a full region of a bead base in the tire to increase the contact pressure of the tire onto the rim. In this case, however, it becomes difficult to conduct a rim assembling operation and a rim dissembling operation. Also, cracks are created on the surface of the bead base to lower the bead portion durability.

For this end, as described in JP-A-2-200504, it is proposed to rationalize the tightening interference (or compression factor) of the rim by rendering the sectional shape of the bead base into such a two-step taper so that the tapering in a portion of the bead base near to bead toe is larger than that near to bead heel. However, the difficulty of rim assembling and dissembling operations is not yet solved completely. Furthermore, when a contact point of the two-step taper or an inflection point approaches under the bead core, cracks are created on the surface of the bead base.

SUMMARY OF THE INVENTION

It is, therefore, an object of the invention to provide a high-speed heavy duty pneumatic tire comprising a radial carcass moored at a pair of bead cores having a circular shape in section which hardly results in rim slippage and troubles such as cracks on the surface of the bead base and the like, and is easy in the rim assembling and dissembling operations.

According to the invention, there is the provision of a high-speed heavy duty pneumatic radial tire comprising a radial carcass moored at a pair of bead cores having a circular shape in section, characterized in that when a distance from an outer surface of one of bead portion to an outer surface of the other bead portion is set to be the same as a rim width of a nominal rim, a point A is a point located at an outermost side in an axial direction of the tire among points indicating a minimum inner diameter of a surface of a bead base, and a point B is a point that a vertical line passing through a center of the bead core to a rotational axis of the tire contacts with the surface of the bead base, and a point C is a point of the surface of the bead base forming a top of a bead toe, these points satisfy the following requirements:

(1) point A is located inward from point B and outward from point C in the axial direction of the tire;
(2) the inner diameter of the surface of the bead base is gradually decreased from a bead heel to point A;
(3) the inner diameter of the surface of the bead base in point A is substantially equal to or gradually and slightly larger than that in point C; and
(4) a distance between point A and point C in the axial direction is 40–80% of a distance between point B and point C in the axial direction.

In a preferable embodiment of the invention, the inner diameter of the surface of the bead base is gradually decreased at a one-step taper from the bead heel to point A.

BRIEF DESCRIPTION OF THE DRAWINGS

The invention will be described with reference to the accompanying drawings, wherein.

DESCRIPTION OF THE PREFERRED EMBODIMENTS

In the tire according to the invention, the bead base ranging from the bead heel to the bead toe has the cross-sectional shape satisfying the requirements (1)–(4) as mentioned above, so that the rim assembling and dissembling operations are considerably improved.

When the distance between the point A and the point C exceeds 80% of the distance between the point B and the point C in the axial direction of the tire, point A extremely approaches point B and hence stress concentration occurs in an inflection point between a tapered part and a flat part of the bead base to cause cracking.

On the other hand, when the distance between the point A and the point B is less than 40% of the distance between the point B and the point C in the axial direction of the tire, point A extremely approaches to the point C and hence abrasion is apt to be caused by rubbing rubber of the bead base surface located at the side of the bead toe on the rim and it tends to make the rim assembling and dissembling operations difficult.

In this type of the tire according to the invention, the distribution of contact pressure between the bead base and the wheel rim reaches a peak in the vicinity of a position just beneath the bead core (point B). According to the invention, therefore, it has been found that rim slippage can be prevented by imparting an adequate tightening interference to the bead base having the above sectional shape in the vicinity of the point B (located just beneath the bead core).

Moreover, if the inflection point exists on the surface of the bead base in the vicinity of the point B (located just beneath the bead core), the stress concentration is apt to be caused to create cracking. In order to avoid such cracking trouble, it is favorable that the inner diameter of the bead base surface is gradually decreased at a one-step taper from the bead heel to the point A in the pneumatic tire according to the invention.

Figure 1:
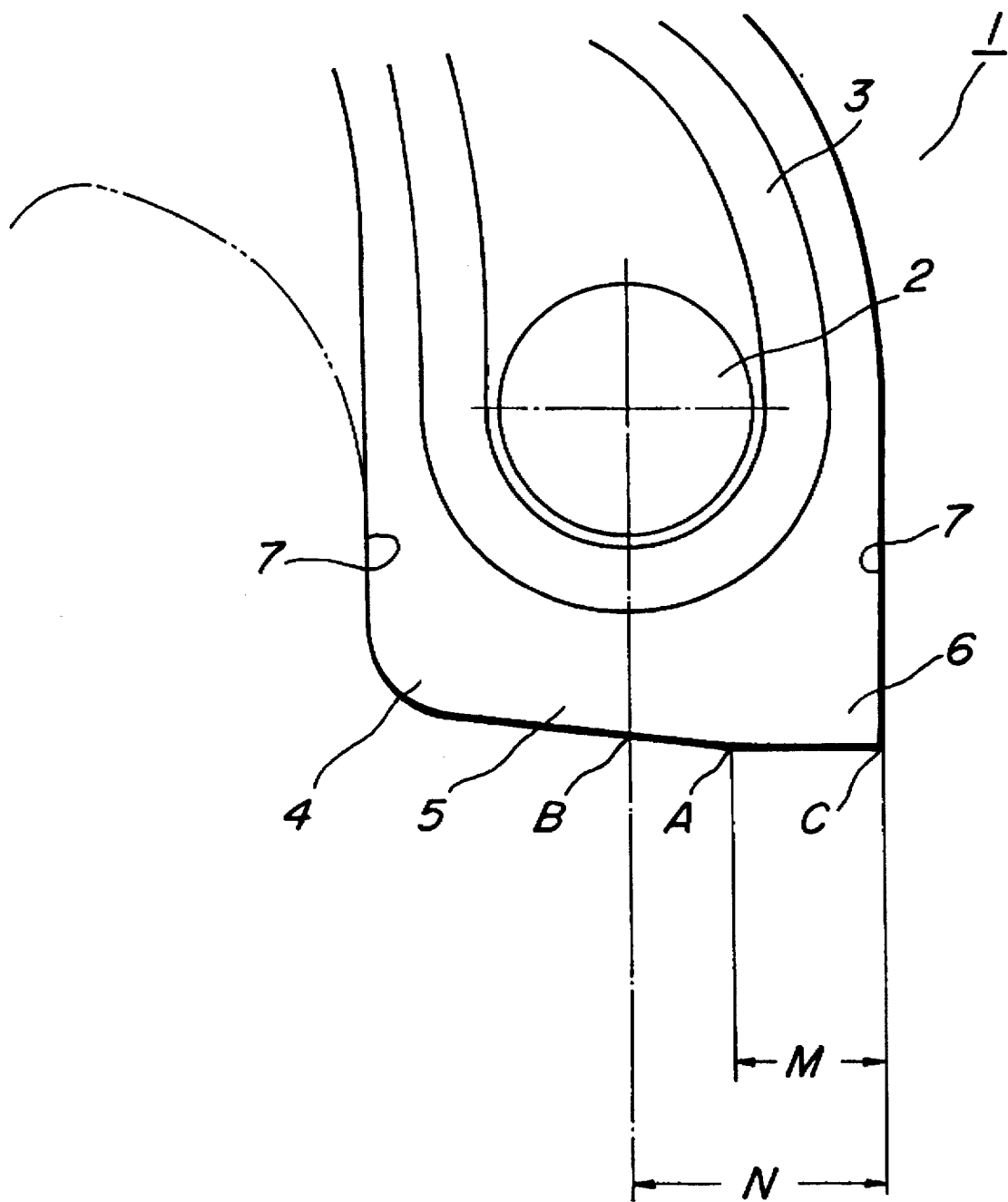
FIG. 1 is a partly sectional fragmentary schematic view of a bead portion in a pneumatic radial tire for an airplane according to the invention at a state of matching a distance between a pair of the bead portions in an axial direction of the tire with a rim width of a nominal rim without assembling onto the rim.

A tire of Example 1 according to the invention will be described with reference to FIG. 1. In FIG. 1 is partly shown a schematic cross-section of a bead portion 1 in a pneumatic radial tire for an airplane according to the invention at a state of matching a distance between a pair of the bead portions in an axial direction of the tire with a rim width (RW) of a nominal rim without assembling onto the rim. The tire has a tire size of H46×18.0 R20 and the nominal rim has a size of H45×17.0–20 and a rim width (RW) of 11 inches (279.4 mm).

Figure 2:
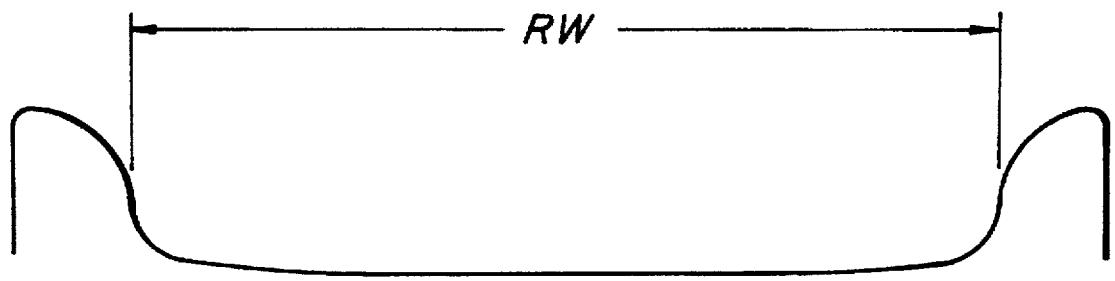
FIG. 2 is a partly sectional meridional schematic view of a rim indicating a rim width (RW) of the rim.

The term "distance between a pair of the bead portions in an axial direction of the tire" used herein means a distance ranging from an outer surface 7 of one of the bead portions to an outer surface 7 of the other bead portion, while the term "rim width (RW)" used herein means a distance ranging from an inner surface of one of the rim flange to an inner surface of the other rim flange as shown in FIG. 2.

In the tire of the illustrated embodiment, the bead portion 1 is provided with a bead core 2 having a circular shape in section, and a carcass 3 comprised of 6 rubberized plies each containing 6,6-nylon cords of 1890 d/3 arranged in a radial direction is moored at the bead core 2. That is, the carcass 3 has so-called updown structure that 4 plies among the above 6 plies are wound around the bead core 2 from inside toward outside and the remaining 2 plies are wound along the outermost turnup portion from outside toward inside. Moreover, the other structural members such as flipper, chafer and the like are omitted without illustration. The bead core 2 is a cable bead having a circular shape in cross-section as shown in FIG. 1, which is an annular spiral wire bundle having a twisting structure of 1×5 mm+(10+16+22+28)×2.2 mm in which four sheath layers are spirally wound around a circular core strand at 10, 16, 22 and 28 turns to butt both free ends to each other.

When the distance from the outer surface 7 of one of bead portion to the outer surface 7 of the other bead portion is set to be the same as the rim width (RW) of the nominal rim, the point A located at an outermost side in an axial direction of the tire among points indicating a minimum inner diameter of a surface of a bead base 5, the point B contacting a vertical line passing through a center of the bead core 2 to a rotational axis of the tire with the surface of the bead base 5, and the point C of the surface of the bead base 5 forming a top of a bead toe 6 satisfy the following requirements:

(1) point A is located inward from point B and outward from point C in the axial direction of the tire;

(2) a downward straight line starting from a bead heel 4 of a convex curved face is extended through point B to the point A at a one-step taper having an inclination angle of 9° with respect to the axial direction of the tire, while the inner diameter of the surface of the bead base is gradually decreased from the bead heel to point A;

(3) the inner diameter of the surface of the bead base in point A is equal to that in point C to form a flat face of the bead base; and (4) the distance M between point A and point C in the axial direction is 40% of the distance N between point B and point C in the axial direction.

A tire of Example 2 is substantially the same as in Example 1 except that the distance M between point A and point C in the axial direction is 60% of the distance N between point B and point C in the axial direction.

A tire of Example 3 is substantially the same as in Example 1 except that the distance M between point A and point C in the axial direction is 80% of the distance N between point B and point C in the axial direction.

A tire of Comparative Example 1 is substantially the same as in Example 1 except that the distance M between point A and point C in the axial direction is 30% of the distance N between point B and point C in the axial direction.

A tire of Comparative Example 2 is substantially the same as in Example 1 except that the distance M between point A and point C in the axial direction is 90% of the distance N between point B and point C in the axial direction.

Figure 3:
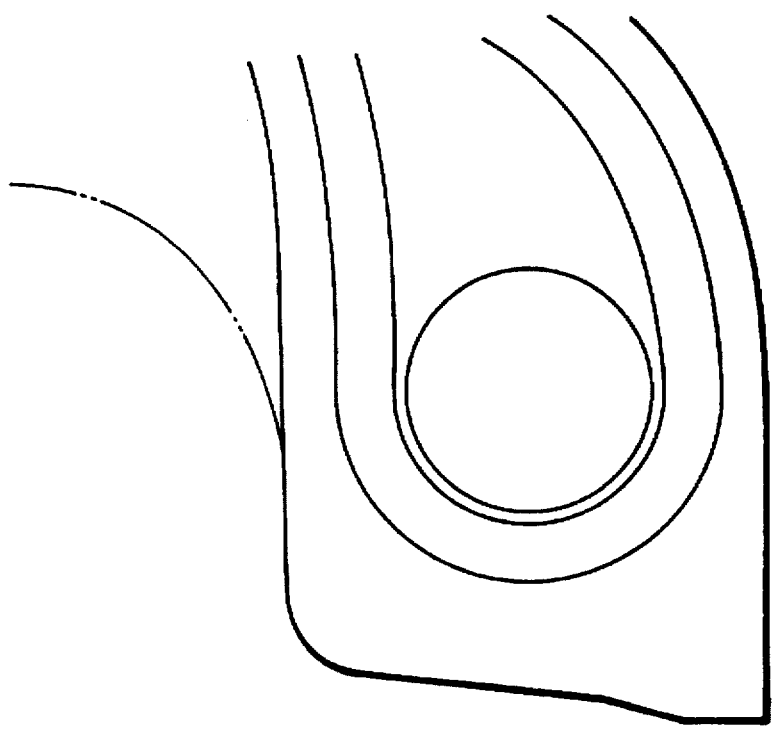
FIG. 3 is a partly sectional fragmentary schematic view of the conventional bead portion having a two-step taper.

A tire of Comparative Example 3 is a tire having a bead base of two-step taper as shown in FIG. 3. That is, the surface of the bead base is extended at a taper of 9° from the bead heel and then at a taper of 14° and finally becomes flat. Further, the distance of the flat part in the axial direction of the tire is 30% of a distance between a point contacting a vertical line passing through a center of the bead core to a rotational axis of the tire with the surface of the bead base, and a point of the surface of the bead base forming a top of a bead toe (point C).

The tire performances are measured with respect to Examples 1–3 and Comparative Examples 1–3 to obtain results as shown in Table 1.

The rim dissembling property is evaluated by assembling the tire onto the nominal rim, inflating under an internal pressure of 14.0 kgf/cm², releasing the internal pressure after 12 hours, and then pushing the sidewall portion of the tire inward by hydraulic means at a state of fastening the rim to measure a pressure required for dissembling the bead portion of the tire from the rim and represented by an index on the basis that Example 2 is 100. The smaller the index value, the easier the rim dissembling operation.

The take-off test on an indoor drum for durability is carried out 50 times under conditions defined in TSO-C62d as a standard for civil airplanes in USA that an internal pressure is 15.3 kgf/cm², a load is 20 ton and a nominal speed is 225 mph, whereby the occurrence of troubles is measured.

TABLE 1

|  | Rim dissembling property | Result of durability test |
| --- | --- | --- |
| Example 1 | 115 | no trouble |
| Example 2 | 100 | no trouble |
| Example 3 | 88 | no trouble |
| Comparative Example 1 | 145 | no trouble |
| Comparative Example 2 | 75 | trouble occurred* |
| Comparative Example 3 | 155 | no trouble |

*Cracks are created in bead base

As seen from the results of Table 1, the tires of Examples 1–3 are excellent in the rim dissembling property and durability as compared with the tires of

COMPARATIVE EXAMPLES 1–3

As mentioned above, according to the invention, there are provided high-speed heavy duty pneumatic tires, particularly airplane tires comprising a radial carcass moored at a pair of bead cores each having a circular shape in section, which hardly create slipping of the tire on the rim and troubles such as cracking on the surface of the bead base and are easy in the rim assembling and dissembling operations.

What is claimed is:

1. A high-speed heavy duty pneumatic radial tire comprising; a radial carcass moored at a pair of bead cores having a circular cross-section, the tire characterized in that when a distance from an outer surface of one bead portion to an outer surface of the other bead portion is set to be the same as a rim width of a nominal rim, a point A is a point located in each bead portion at an outermost side in an axial direction of the tire among points indicating a minimum inner diameter of a surface of a bead base, and a point B is a point where in each bead portion a vertical line passing through a center of the bead core to a rotational axis of the tire contacts with the surface of the bead base, and a point C is a point in each bead portion of the surface of the bead base forming a top of a bead toe, points A, B and C satisfy the following requirements:

(1) point A is located inward from point B and outward from point C in the axial direction of the tire;

(2) the inner diameter of the surface of the bead base is gradually decreased from a bead heel to point A;

(3) the inner diameter of the surface of the bead base in point A is substantially equal to or gradually and slightly larger than that in point C; and (4) a distance between point A and point C in the axial direction is 40–80% of a distance between point B and point C in the axial direction.

2. A high-speed heavy duty pneumatic radial tire according to claim 1, wherein the inner diameter of the surface of the bead base is gradually decreased at a one-step taper from the bead heel to point A.

3. A high-speed heavy duty pneumatic radial tire according to claim 1 wherein each of said bead cores is a cable bead having a circular shape formed by a wire bundle having a twisting structure of $1\times5$ mm+$(10+16+22+28)\times2.2$ mm.

4. A high-speed heavy duty pneumatic radial tire according to claim 1 wherein said carcass comprises six rubberized plies each containing 6,6-nylon cords of 1890 d/3.

5. A high-speed heavy duty pneumatic radial tire according to claim 1 wherein in each bead portion a downward straight line beginning from a bead heel and extending through point B and point A defines a one-step taper having an inclination angle of 9° with respect to the axial direction of the tire.

* * * * *